(12) United States Patent
Amano et al.

(10) Patent No.: US 12,045,341 B2
(45) Date of Patent: Jul. 23, 2024

(54) UNAUTHORIZED COMMUNICATION DETECTION DEVICE, UNAUTHORIZED COMMUNICATION DETECTION METHOD AND MANUFACTURING SYSTEM

(71) Applicant: PANASONIC INTELLECTUAL PROPERTY MANAGEMENT CO., LTD., Osaka (JP)

(72) Inventors: Hiroshi Amano, Osaka (JP); Narumi Atsuta, Fukuoka (JP); Noriaki Hamada, Kanagawa (JP); Yosuke Tajika, Hyogo (JP); Nobutaka Kawaguchi, Osaka (JP); Yuichi Higuchi, Osaka (JP); Taichi Shimizu, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 85 days.

(21) Appl. No.: 16/973,898

(22) PCT Filed: Jun. 7, 2019

(86) PCT No.: PCT/JP2019/022669
§ 371 (c)(1),
(2) Date: Dec. 10, 2020

(87) PCT Pub. No.: WO2019/240020
PCT Pub. Date: Dec. 19, 2019

(65) Prior Publication Data
US 2021/0264026 A1    Aug. 26, 2021

(30) Foreign Application Priority Data

Jun. 13, 2018 (JP) .................................. 2018-113112

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC ........................ G06F 21/554; G06F 2221/034
See application file for complete search history.

(56) References Cited

U.S. PATENT DOCUMENTS

| 2004/0172557 A1* | 9/2004 | Nakae ..................... H04L 63/20 726/22 |
| 2011/0302131 A1 | 12/2011 | Kawaba |

(Continued)

FOREIGN PATENT DOCUMENTS

| JP | 2007-164313 A | 6/2007 |
| JP | 2011-253355 A | 12/2011 |

(Continued)

OTHER PUBLICATIONS

Istvan et al. "A lustering-based approach to detect cyber attacks in process control systems," IEEE 13th international conference on industrial informatics (INDIN), 2015, p. 142-148 (Year: 2015).*

(Continued)

*Primary Examiner* — Carl G Colin
*Assistant Examiner* — Zhe Liu
(74) *Attorney, Agent, or Firm* — Rimon P.C.

(57) ABSTRACT

An unauthorized communication detection device that detects unauthorized communication in a manufacturing system that manufactures products includes: an obtainer that obtains operation information of the manufacturing system; a storage that stores element information indicating one or more target elements among a plurality of elements related to manufacturing of the products; a specifier that specifies, for each of a plurality of communications performed in the manufacturing system, an element corresponding to the communication, based on the operation information; a cal- (Continued)

culator that calculates an abnormal degree of each of one or more communications, which satisfy that the element specified by the specifier is included in the one or more target elements indicated by the element information, among the plurality of communications; and a determiner that determines that, when an abnormal degree calculated by the calculator is larger than a threshold value, a communication corresponding to the abnormal degree is the unauthorized communication.

16 Claims, 12 Drawing Sheets

(56) References Cited

U.S. PATENT DOCUMENTS

| | | | |
|---|---|---|---|
| 2012/0030761 A1 | 2/2012 | Baba et al. | |
| 2013/0212681 A1* | 8/2013 | Endoh | H04L 63/1416 |
| | | | 726/23 |
| 2015/0169393 A1* | 6/2015 | Shibuya | G05B 23/0243 |
| | | | 702/182 |
| 2016/0011589 A1* | 1/2016 | Yamada | H01L 22/20 |
| | | | 700/110 |
| 2016/0085237 A1* | 3/2016 | Yunoki | H04L 69/40 |
| | | | 726/22 |
| 2016/0094578 A1* | 3/2016 | McQuillan | H04L 63/1466 |
| | | | 726/23 |
| 2017/0011409 A1* | 1/2017 | Eager | G06Q 30/0201 |
| 2017/0099311 A1* | 4/2017 | Kesin | H04L 67/535 |
| 2017/0199902 A1* | 7/2017 | Mishra | G06N 5/01 |
| 2017/0214717 A1* | 7/2017 | Bush | G05B 19/4185 |
| 2018/0109955 A1* | 4/2018 | Nixon | H04L 41/0806 |
| 2018/0174434 A1* | 6/2018 | Dyer | G08C 17/02 |
| 2018/0191743 A1* | 7/2018 | Reddy | G06N 20/00 |
| 2018/0241719 A1* | 8/2018 | Koniki | H04L 63/0245 |
| 2018/0316584 A1 | 11/2018 | Ujiie et al. | |
| 2019/0080080 A1* | 3/2019 | Ogura | G06F 21/572 |
| 2019/0102921 A1* | 4/2019 | Mittal | G06F 3/0481 |
| 2019/0116157 A1* | 4/2019 | Kishikawa | G06F 21/645 |
| 2019/0163907 A1* | 5/2019 | Scofield | G06F 21/53 |
| 2019/0205531 A1* | 7/2019 | McMurdie | G06N 20/00 |
| 2019/0318029 A1* | 10/2019 | Simkin | H04L 67/01 |
| 2020/0314130 A1* | 10/2020 | Nakai | H04L 63/1425 |
| 2021/0006570 A1* | 1/2021 | Nakai | H04L 63/105 |
| 2021/0026343 A1* | 1/2021 | Konashi | H04L 69/40 |

FOREIGN PATENT DOCUMENTS

| | | |
|---|---|---|
| JP | 2012-034273 A | 2/2012 |
| JP | 2017-126978 A | 7/2017 |
| JP | 2017-216569 A | 12/2017 |
| WO | 2014/155650 A1 | 10/2014 |

OTHER PUBLICATIONS

International Search Report and Written Opinion issued in International Patent Application No. PCT/JP2019/022669, dated Aug. 6, 2019; with partial English translation.

* cited by examiner

FIG. 3

|  | Source | Destination | Communication whitelist |
|---|---|---|---|
| Communication 1 | 192.168.0.16 | 192.168.0.1 | Exist |
| Communication 2 | 192.168.0.2 | 192.168.0.3 | Exist |
| Communication 3 | 192.168.0.4 | 192.168.0.5 | Not exist |
| Communication 4 | 192.168.0.6 | 192.168.0.7 | Not exist |
| Communication 5 | 192.168.0.8 | 192.168.0.9 | Exist |
| Communication 6 | 192.168.0.10 | 192.168.0.11 | Exist |
| Communication 7 | 192.168.0.12 | 192.168.0.13 | Not exist |
| Communication 8 | 192.168.0.14 | 192.168.0.15 | Not exist |

FIG. 4

|  | Source | Destination | Communication whitelist |
|---|---|---|---|
| Communication 1 | 192.168.0.16 | 192.168.0.1 | Exist |
| Communication 2 | 192.168.0.2 | 192.168.0.3 | Exist |
| Communication 5 | 192.168.0.8 | 192.168.0.9 | Exist |
| Communication 6 | 192.168.0.10 | 192.168.0.11 | Exist |

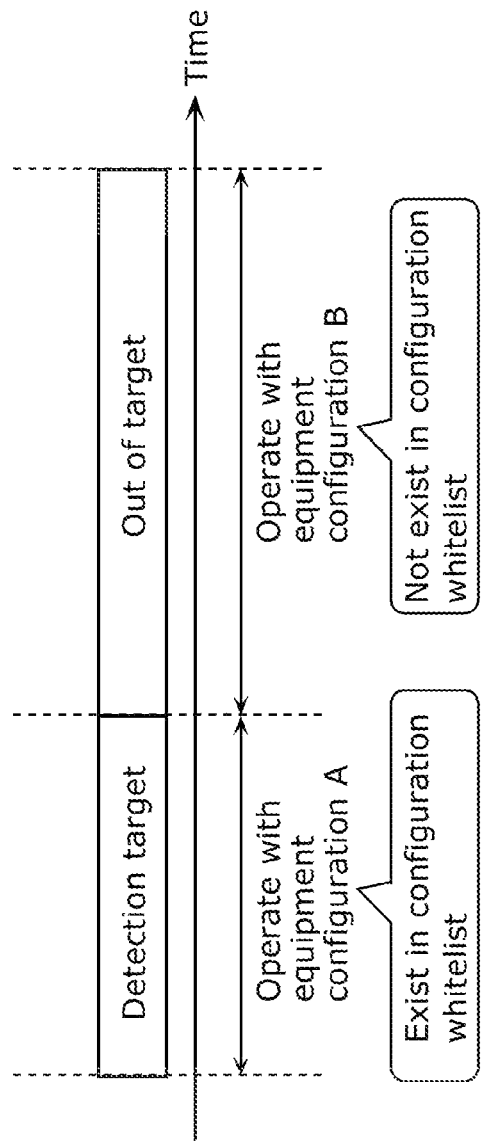

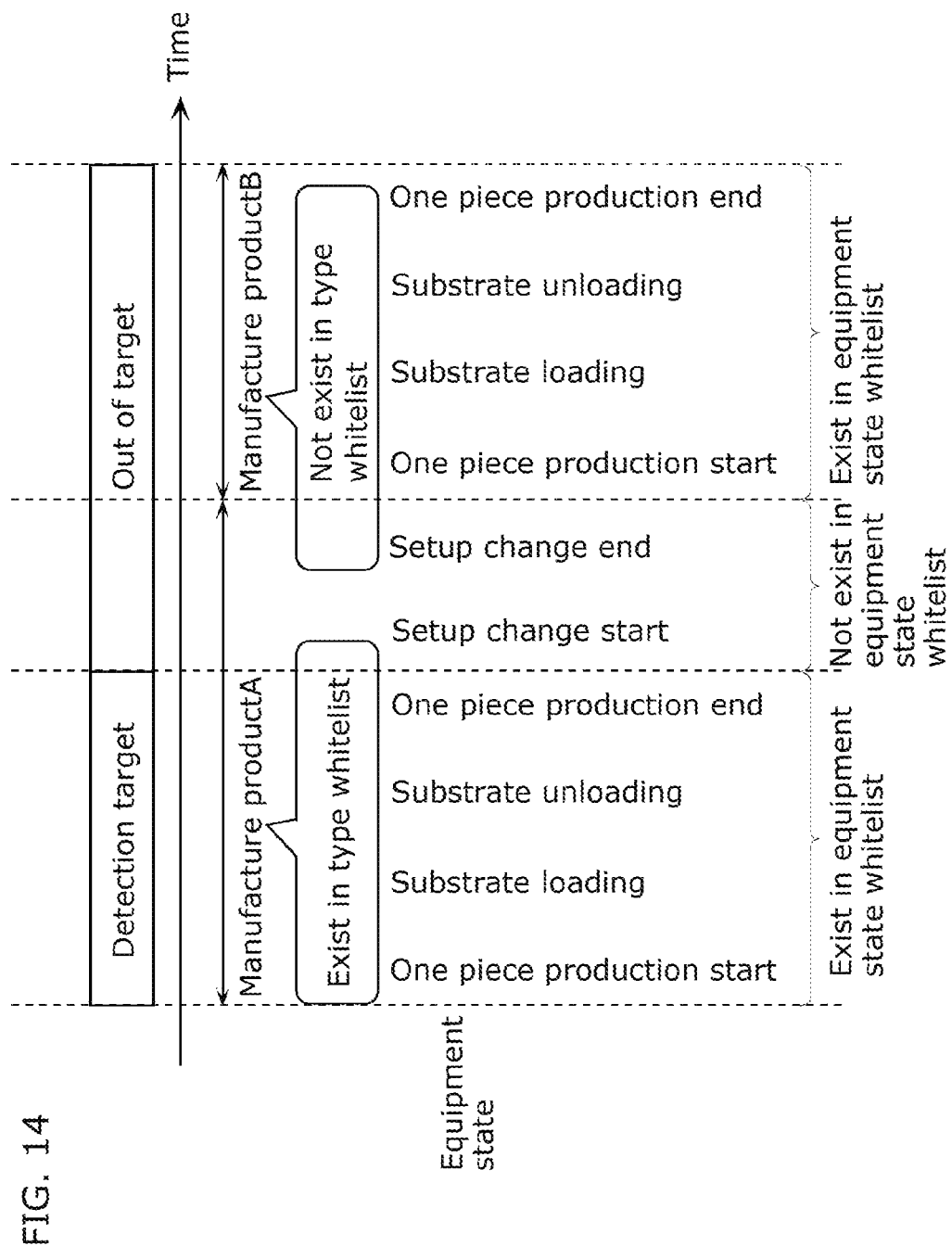

UNAUTHORIZED COMMUNICATION DETECTION DEVICE, UNAUTHORIZED COMMUNICATION DETECTION METHOD AND MANUFACTURING SYSTEM

CROSS-REFERENCE OF RELATED APPLICATIONS

This application is the U.S. National Phase under 35 U.S.C. § 371 of International Patent Application No. PCT/JP2019/022669, filed on Jun. 7, 2019, which in turn claims the benefit of Japanese Application No. 2018-113112, filed on Jun. 13, 2018, the entire disclosures of which Applications are incorporated by reference herein.

TECHNICAL FIELD

The present disclosure relates to an unauthorized communication detection device, an unauthorized communication detection method, and a manufacturing system.

BACKGROUND ART

In recent years, communication between a plurality of manufacturing devices has been carried out at manufacturing sites such as factories. Therefore, it is required to improve the security of communication.

For example, in Patent Literature (PTL) 1, an unauthorized communication detection system that detects unauthorized communication by determining the success or failure of establishing a communication session, and comparing the traffic pattern information indicating the traffic pattern of the packet in which the session is not established with the traffic pattern whitelist is disclosed.

CITATION LIST

Patent Literature

[PTL 1] Japanese Unexamined Patent Application Publication No. 2012-34273

SUMMARY OF INVENTION

Technical Problem

However, the above conventional unauthorized communication detection system may not be able to detect unauthorized communication with high accuracy. For example, in the above conventional unauthorized communication detection system, it is not possible to detect when the communication in which a session is established is unauthorized.

Therefore, the present disclosure provides an unauthorized communication detection device, an unauthorized communication detection method, and a manufacturing system that can accurately detect unauthorized communication in a manufacturing system.

Solution to Problem

In order to solve the above problem, the unauthorized communication detection device according to one aspect of the present disclosure is an unauthorized communication detection device that detects an unauthorized communication in a manufacturing system that manufactures products, the unauthorized communication detection device comprising: an obtainer that obtains operation information of the manufacturing system; a storage that stores element information indicating one or more target elements among a plurality of elements related to manufacturing of the products; a specifier that specifies, for each of a plurality of communications performed in the manufacturing system, an element corresponding to the communication, based on the operation information; a calculator that calculates an abnormal degree of each of one or more communications, which satisfy that the element specified by the specifier is included in the one or more target elements indicated by the element information, among the plurality of communications; and a determiner that determines that, when the abnormal degree calculated by the calculator is larger than a threshold value, a communication corresponding to the abnormal degree is the unauthorized communication.

In addition, the manufacturing system according to one aspect of the present disclosure is a manufacturing system that manufactures products, the manufacturing system including: the above unauthorized communication detection device.

In addition, the unauthorized communication detection method according to one aspect of the present disclosure is an unauthorized communication detection method in which unauthorized communication in a manufacturing system that manufactures products is detected, the unauthorized communication detection method including: obtaining operation information of the manufacturing system; reading element information indicating one or more target elements among a plurality of elements related to manufacturing of the products out of a storage; specifies, for each of a plurality of communications performed in the manufacturing system, an element corresponding to the communication, based on the operation information; calculating an abnormal degree of each of one or more communications, which satisfy that the element specified is included in one or more target elements indicated by the element information, among the plurality of communications; and determining that a communication corresponding to the abnormal degree is the unauthorized communication when the abnormal degree calculated exceeds a threshold value.

In addition, one aspect of the present disclosure can be realized as a program for causing a computer to execute the above unauthorized communication detection method. Alternatively, it can also be realized as a computer-readable recording medium on which the program is stored.

Advantageous Effects of Invention

According to the present disclosure, unauthorized communication in the manufacturing system can be detected with high accuracy.

BRIEF DESCRIPTION OF DRAWINGS

FIG. 3 is a diagram showing a plurality of communication information and collation results with respect to a communication whitelist.

FIG. 4 is a diagram showing communication information that is a target of behavior detection by the unauthorized communication detection device according to Embodiment 1.

FIG. 13 is a diagram showing an example of collation results with respect to a configuration whitelist for each equipment configuration.

FIG. 14 is a diagram showing an example of collation results with respect to each of the equipment state whitelist and the type whitelist.

DESCRIPTION OF EMBODIMENTS

Summary of the Present Disclosure

Figure 1:
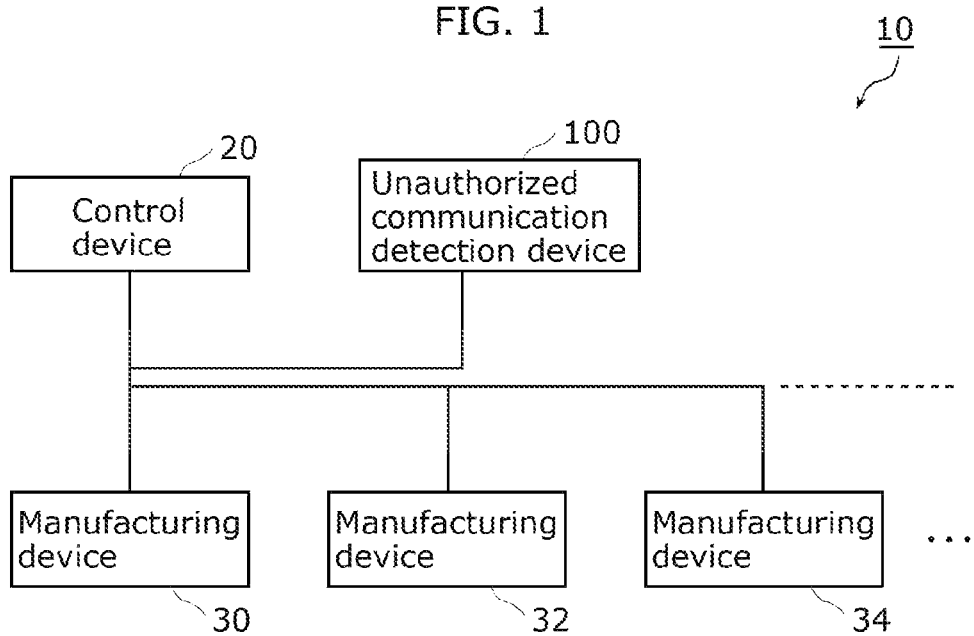
FIG. 1 is a block diagram showing a configuration of a manufacturing system according to Embodiment 1.

As described above, at a manufacturing site such as a factory, a plurality of manufacturing devices communicate with each other to manufacture products in cooperation with each other. For this reason, when a malicious attack is received from the outside on the communication, the load on each manufacturing device may increase or the manufacturing device may fail, so that there is such a risk that the productivity of the products decreases. Therefore, it is required to enhance the security of communication via the internal network of the manufacturing system. For example, it is required to take measures such as preventing unauthorized access to the internal network.

Specifically, measures to introduce a firewall at the entrance to the internal network can be considered. This makes it possible to suppress malicious connections from the outside. However, for example, when a security threat, that is, a vulnerability is discovered on a firewall, it is not possible to respond to an attack (so-called zero-day attack) before the vulnerability is addressed.

In addition, even if the firewall is functioning normally, it is not possible to prevent unauthorized operation from the inside due to human factors such as the operator or administrator of the manufacturing devices. For example, when a computer device or memory device infected with a virus is connected to an internal network, the infection spreads to each manufacturing device regardless of the malicious intent of the operator.

In this way, dealing with unauthorized access at the entrance to the internal network is not perfect.

In addition, by installing security software for each of a plurality of manufacturing devices, it is possible to take measures to detect unauthorized processing for each manufacturing device. However, since there are a wide variety of manufacturing devices, it is not always possible to install security software in all manufacturing devices. If there is even one manufacturing device for which no countermeasures have been taken, there is a possibility that unauthorized access or the like may be performed through the manufacturing device.

Therefore, in order to solve the above problems, the unauthorized communication detection device according to one aspect of the present disclosure is an unauthorized communication detection device that detects an unauthorized communication in a manufacturing system that manufactures products, the unauthorized communication detection device comprising: an obtainer that obtains operation information of the manufacturing system; a storage that stores element information indicating one or more target elements among a plurality of elements related to manufacturing of the products; a specifier that specifies, for each of a plurality of communications performed in the manufacturing system, an element corresponding to the communication, based on the operation information; a calculator that calculates the abnormal degree of each of one or more communications, which satisfy that the element specified by the specifier is included in the one or more target elements indicated by the element information, among the plurality of communications; and a determiner that determines that, when the abnormal degree calculated by the calculator is larger than a threshold value, a communication corresponding to the abnormal degree is the unauthorized communication.

With this, when the storage stores as element information, for example, information indicating an element during normal operation of the manufacturing system as a target element, communication corresponding to an element not included in the target element indicated by the element information can be determined to be unauthorized communication. In addition, even if the communication corresponds to the target element indicated by the element information, the abnormal degree of the communication is calculated, so that it can be determined whether or not the communication is an unauthorized communication. In this way, since it is possible to perform a two-step determination using the determination according to the element information and the determination based on the abnormal degree, it is possible to accurately detect the unauthorized communication of the manufacturing system.

In addition, for example, the element information includes permitted communication information indicating one or more permitted communications as the one or more target elements, the specifier specifies, as the element, each of the plurality of communications, based on the operation information, and the calculator may calculate an abnormal degree of each of one or more communications, which satisfy that a communication specified by the specifier is included in the one or more communications indicated by the permitted communication information, among the plurality of communications.

This makes it possible to detect even permitted communication with a high abnormal degree as an unauthorized communication. For example, it is possible to detect unauthorized communication performed by a virus or the like that has invaded the inside of a manufacturing system.

In addition, for example, the determiner may further determine that one or more communications, which satisfy that the communication specified by the specifier is not included in the one or more communications indicated by the permitted communication information, among the plurality of communications are unauthorized communications.

This makes it possible to detect not only unpermitted communication but also permitted communication with a high abnormal degree.

In addition, for example, the element information further includes equipment state information indicating one or more equipment states among a plurality of equipment states that the manufacturing system is capable of taking as the one or more target elements, the specifier further specifies, as the element, an equipment state at a time when each of the plurality of communications is performed, based on the operation information, and the calculator may calculate an abnormal degree of each of one or more communications, which further satisfy that an equipment state specified by the specifier is included in the one or more equipment states indicated by the equipment state information, among the plurality of communications.

This makes it possible to determine whether or not the communication performed when the state of the manufacturing system is the equipment state indicated by the equipment state information is unauthorized communication. For example, when the equipment state information indicates the equipment state that can be normally taken to manufacture products, communication performed in the equipment state that does not normally occur can be excluded from the detection target of unauthorized communication. Thus, it is possible to suppress erroneous determination of unauthorized communication and improve the determination accuracy of unauthorized communication.

In addition, for example, the manufacturing system manufactures a plurality of products of different types, the element information further includes type information indicating one or more types of the plurality of products as the one or more target elements, the specifier further specifies, as the element, a type of products manufactured at a time when each of the plurality of communications is performed, based on the operation information, and the calculator may calculate an abnormal degree of each of one or more communications, which further satisfy that the type specified by the specifier is included in the one or more types indicated by the type information, among the plurality of communications This makes it possible to determine whether or not the communication performed when manufacturing the type of product indicated by the type information is unauthorized communication. For example, when the type information indicates the type of products planned to be manufactured, communication generated when manufacturing products other than the products can be excluded from the detection target of unauthorized communication. Thus, it is possible to suppress erroneous determination of unauthorized communication and improve the determination accuracy of unauthorized communication.

In addition, for example, the element information further includes configuration information indicating one or more equipment configurations among a plurality of equipment configurations of the manufacturing system as the one or more target elements, the specifier further specifies, as the element, an equipment configuration at a time when each of the plurality of communications is performed, based on the operation information, and the calculator may calculate an abnormal degree of each of one or more communications, which further satisfy that the equipment configuration specified by the specifier is included in the one or more equipment configurations indicated by the configuration information, among the plurality of communications.

This makes it possible to determine whether or not the communication performed when manufacturing products with the equipment configuration indicated by the configuration information is unauthorized communication. For example, when the configuration information indicates a planned equipment configuration, communication generated when products are manufactured with an equipment configuration other than the equipment configuration can be excluded from the detection target of unauthorized communication. Thus, it is possible to suppress erroneous determination of unauthorized communication and improve the determination accuracy of unauthorized communication.

In addition, for example, the calculator may calculate an outlier from a normal model of communication performed by the manufacturing system as the abnormal degree.

With this, for example, by using a normal model generated based on statistical processing, the reliability of the calculated abnormal degree becomes high, so that the detection accuracy of unauthorized communication can be improved.

In addition, for example, the unauthorized communication detection device according to one aspect of the present disclosure may further include a learner that creates the normal model by performing machine learning using operation information obtained in advance; and an information generator that generates information indicating one or more elements corresponding to each of a plurality of communications included in operation information targeted for the machine learning as the one or more target elements as the element information.

With this, the element corresponding to the communication included in the operation information targeted for machine learning can be included in the element information, so that the communication corresponding to the element not targeted for machine learning can be excluded from the target for calculating the abnormal degree (that is, the detection target of unauthorized communication).

For example, when the abnormal degree is calculated for the communication when the equipment state is different from the equipment state corresponding to the communication targeted for machine learning, even when the communication is not unauthorized communication, there is a high possibility that it will be erroneously determined as unauthorized communication. By comprehensively targeting all equipment states that the manufacturing system can be taken for machine learning, erroneous determination can be suppressed. However, various equipment states including unexpected equipment states (events) can occur in a manufacturing system, so that it is difficult to comprehensively target all the equipment states for machine learning. On the other hand, according to the present embodiment, elements that are not the target of machine learning can be excluded from the detection target of unauthorized communication, so that it is possible to suppress erroneous determination and improve the determination accuracy of unauthorized communication.

In addition, for example, the element information includes equipment state information indicating one or more equipment states among a plurality of equipment states that the manufacturing system is capable of taking as the one or more target elements, the specifier specifies, as the element, an equipment state at a time when each of the plurality of communications is performed, based on the operation information, and the calculator may calculate an abnormal degree of each of one or more communications, which satisfy that the equipment state specified by the specifier is included in the one or more equipment states indicated by the equipment state information, among the plurality of communications.

This makes it possible to determine whether or not the communication performed when the state of the manufacturing system is the equipment state indicated by the equipment state information is unauthorized communication. For example, when the equipment state information indicates the equipment state that can be normally taken to manufacture products, communication performed in the equipment state that does not normally occur can be excluded from the detection target of unauthorized communication. Thus, it is possible to suppress erroneous determination of unauthorized communication and improve the determination accuracy of unauthorized communication.

In addition, for example, the manufacturing system manufactures a plurality of products of different types, the element information includes type information indicating one or more types of the plurality of products as the one or more target elements, the specifier specifies, as the element, a type of products manufactured at a time when each of the plurality of communications is performed, based on the operation information, and the calculator may calculate an abnormal degree of each of one or more communications, which satisfy that the type specified by the specifier is included in the one or more types indicated by the type information, among the plurality of communications.

This makes it possible to determine whether or not the communication performed when manufacturing the type of product indicated by the type information is unauthorized communication. For example, when the type information indicates the type of products planned to be manufactured, communication generated when manufacturing products other than the products can be excluded from the detection target of unauthorized communication. Thus, it is possible to suppress erroneous determination of unauthorized communication and improve the determination accuracy of unauthorized communication.

In addition, for example, the element information includes configuration information indicating one or more equipment configurations among a plurality of equipment configurations of the manufacturing system as the one or more target elements, the specifier specifies, as the element, an equipment configuration at a time when each of the plurality of communications is performed, based on the operation information, and the calculator may calculate an abnormal degree of each of one or more communications, which satisfy that the equipment configuration specified by the specifier is included in the one or more equipment configurations indicated by the configuration information, among the plurality of communications.

This makes it possible to determine whether or not the communication performed when manufacturing products with the equipment configuration indicated by the configuration information is unauthorized communication. For example, when the configuration information indicates a planned equipment configuration, communication generated when products are manufactured with an equipment configuration other than the equipment configuration can be excluded from the detection target of unauthorized communication. Thus, it is possible to suppress erroneous determination of unauthorized communication and improve the determination accuracy of unauthorized communication.

In addition, for example, the manufacturing system according to one aspect of the present disclosure is a manufacturing system that manufactures products, and includes the unauthorized communication detection device described above.

With this, as with the above unauthorized communication detection device, unauthorized communication can be detected with high accuracy, so that the detected unauthorized communication can be dealt with promptly. Therefore, a highly productive manufacturing system can be realized.

In addition, for example, the unauthorized communication detection method according to one aspect of the present disclosure is an unauthorized communication detection method in which unauthorized communication in a manufacturing system that manufactures products is detected, the unauthorized communication detection method including: obtaining operation information of the manufacturing system; reading element information indicating one or more target elements among a plurality of elements related to manufacturing of the products out of a storage; specifies, for each of a plurality of communications performed in the manufacturing system, an element corresponding to the communication, based on the operation information; calculating an abnormal degree of each of one or more communications, which satisfy that the element specified is included in one or more target elements indicated by the element information, among the plurality of communications; and determining that a communication corresponding to the abnormal degree is the unauthorized communication when the abnormal degree calculated exceeds a threshold value.

With this, it is possible to accurately detect unauthorized communication in the manufacturing system, similar to the above unauthorized communication detection device.

Hereinafter, the embodiments will be specifically described with reference to the drawings.

It should be noted that all of the embodiments described below are comprehensive or specific examples. Numerical values, shapes, materials, components, arrangement positions and connection forms of components, steps, order of steps, and the like shown in the following embodiments are merely examples, and are not intended to limit the present disclosure. In addition, among the components in the following embodiments, the components not described in the independent claims will be described as arbitrary components.

In addition, each figure is a schematic view and is not necessarily exactly illustrated. Therefore, for example, the scales and the like do not always match in each figure. In addition, in each figure, substantially the same configuration is designated by the same reference numerals, and duplicate description will be omitted or simplified.

Embodiment 1

First, the outline of the manufacturing system according to Embodiment 1 will be described with reference to FIG. 1. FIG. 1 is a block diagram showing a configuration of manufacturing system 10 according to the present embodiment.

As shown in FIG. 1, manufacturing system 10 is a system for manufacturing products, and includes control device 20, manufacturing devices 30, 32, and 34, and unauthorized communication detection device 100. Control device 20 and each of manufacturing devices 30, 32 and 34 are communicably connected via a network.

Control device 20 controls manufacturing devices 30, 32, and 34. Control device 20 is realized by, for example, a computer device and the like. Control device 20 is realized by a non-volatile memory in which a program is stored, a volatile memory which is a transitory storage area for executing a program, an input/output port, a processor for executing a program, and the like. Each function of control device 20 may be realized by software executed by a processor, or may be realized by hardware such as an electronic circuit including a plurality of circuit elements.

Manufacturing devices 30, 32 and 34 manufacture products. For example, manufacturing devices 30, 32, and 34 are arranged side by side along the manufacturing line. Manufacturing devices 30, 32 and 34 perform, for example, steps for manufacturing one product which are different from one another, Manufacturing devices 30, 32, and 34 are, for example, component mounting machines, respectively. Alternatively, at least one of manufacturing devices 30, 32, or 34 may be a substrate transfer device, a component supply device, or the like.

It should be noted that the configuration of manufacturing system 10 is not limited to the example shown in FIG. 1. For example, although an example in which the number of manufacturing devices included in manufacturing system 10 is three is shown in FIG. 1, the number may be only one, two, or four or more. In addition, manufacturing system 10 does not have to include control device 20, and the plurality of manufacturing devices 30, 32, and 34 may cooperate with each other to manufacture products by communicating with each other.

Unauthorized communication detection device 100 is an example of an abnormality detection device that detects an abnormality in manufacturing system 10. Unauthorized communication detection device 100 detects unauthorized communication in manufacturing system 10. Unauthorized communication detection device 100 is realized by, for example, a computer device. Unauthorized communication detection device 100 is realized by a non-volatile memory in which a program is stored, a volatile memory which is a temporary storage area for executing a program, an input/output port, a processor in which the program is executed, and the like. Each function of unauthorized communication detection device 100 may be realized by software executed by a processor, or may be realized by hardware such as an electronic circuit including a plurality of circuit elements.

Figure 2:
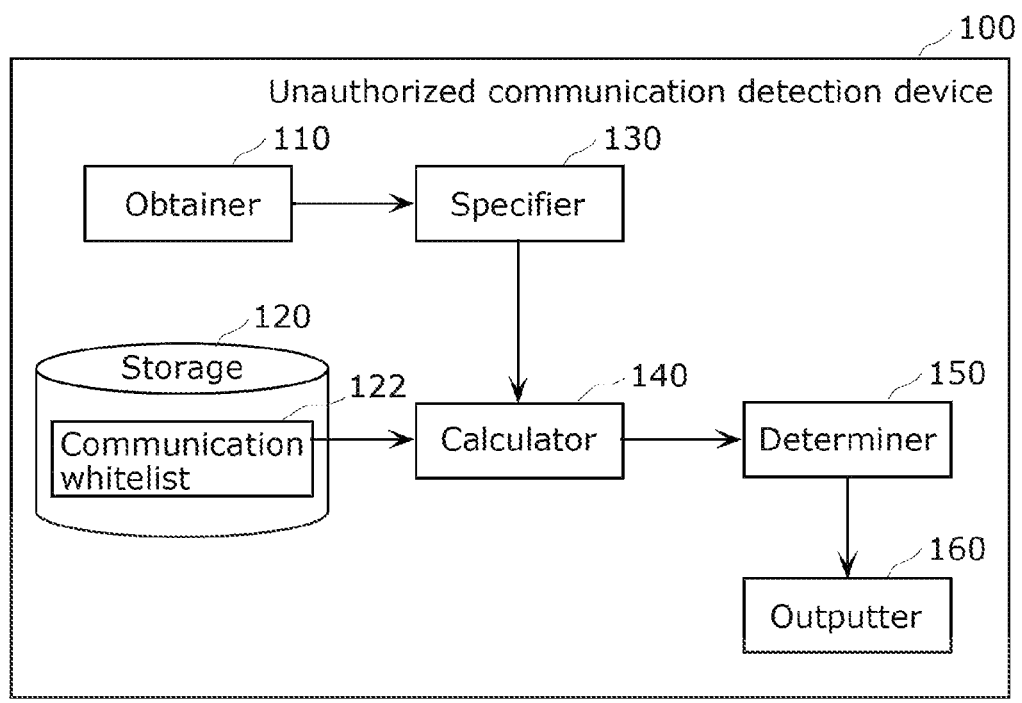
FIG. 2 is a block diagram showing a configuration of an unauthorized communication detection device according to Embodiment 1.

FIG. 2 is a block diagram showing the configuration of unauthorized communication detection device 100 according to the present embodiment. As shown in FIG. 2, unauthorized communication detection device 100 includes obtainer 110, storage 120, specifier 130, calculator 140, determiner 150, and outputter 160.

Obtainer 110 obtains the operation information of manufacturing system 10. Specifically, obtainer 110 obtains a plurality of communication information. The plurality of communication information is included in the operation information and is information related to the communication performed in manufacturing system 10.

FIG. 3 is a diagram showing a plurality of communication information and collation results with respect to the communication whitelist. As shown in FIG. 3, each of the plurality of communication information includes, for example, a source and a destination of one communication. The source and the destination are each indicated by an IP address or the like. In addition, each of the plurality of communication information includes feature amounts related to communication. The feature amounts related to communication are physical quantities whose values are different from those in the normal state when unauthorized communication occurs. The feature amounts are, for example, at least one of the number of packets of the communication, the maximum size of the packets, or the maximum value or the average value of the arrival intervals of the packets. The feature amounts are used in statistical processing for calculating an abnormal degree. Obtainer 110 obtains communication information including the feature amounts such as the number of packets, for example, by mirroring and receiving the communication between the devices.

Storage 120 is a memory for storing element information indicating one or more target elements among a plurality of elements related to products. Storage 120 is realized by a non-volatile storage element such as an HDD (Hard Disk Drive) or a semiconductor memory.

The element information corresponds to a whitelist showing the permitted elements among a plurality of elements related to the manufacturing of the products. In the present embodiment, the element is communication between devices. Storage 120 stores communication whitelist 122, which is an example of element information. Communication whitelist 122 is an example of permitted communication information indicating one or more permitted communications as one or more target elements. Communication whitelist 122 is generated by registering the permitted communication by the administrator of manufacturing system 10 or the like, and is stored in storage 120. It should be noted that communication whitelist 122 may be generated based on the results of machine learning as described later in Embodiment 2 or the like.

Specifier 130 specifies, for each of a plurality of communications performed in manufacturing system 10, an element corresponding to the communication, based on the operation information. In the present embodiment, specifier 130 specifies each of the plurality of communications as an element based on the operation information obtained by obtainer 110. That is, in the present embodiment, the element corresponding to the communication is the communication itself. Specifically, specifier 130 specifies the communication by extracting the source and the destination included in the communication information for each communication.

Calculator 140 calculates an abnormal degree for each of a plurality of communications, which satisfy that the element specified by specifier 130 is included in one or more target elements indicated by the element information stored in storage 120, among the plurality of communications performed in manufacturing system 10. In the present embodiment, calculator 140 calculates the abnormal degree for each of a plurality of communications, which satisfy that the communication specified by specifier 130 is included in the one or more communications indicated by communication whitelist 122 stored in storage 120.

For example, the example shown in FIG. 3 shows that communications 1 to 8 were performed in manufacturing system 10. Of communications 1 to 8, it is determined that communication 1, communication 2, communication 5, and communication 6 are included in the communications indicated by communication whitelist 122. Thus, as shown in FIG. 4, calculator 140 calculates the abnormal degrees of the four communications corresponding to communication 1, communication 2, communication 5, and communication 6. Specifically, calculator 140 performs behavior detection for communication 1, communication 2, communication 5, and communication 6. It should be noted that FIG. 4 is a diagram showing communication information that is the target of behavior detection by unauthorized communication detection device 100 according to the present embodiment.

Specifically, calculator 140 reads communication whitelist 122 out of storage 120, collates the communication specified by specifier 130 with communication whitelist 122, and to thereby determine whether or not the specified communication is included in communication whitelist 122.

Calculator 140 calculates the abnormal degree of each communication by performing the behavior detection for one or more target communications. The abnormal degree is an outlier from the normal model, that is, normal behavior of communication performed by manufacturing system 10. It should be noted that the algorithm for calculating the abnormal degree is not limited to the behavior detection, but may be the Local Outlier Factor (LOF) method, Support Vector Machine (SVM) method, or k-Nearest Neighbor (kNN) method.

When the abnormal degree calculated by calculator 140 is larger than the threshold value, determiner 150 determines that the communication corresponding to the abnormal degree larger than the threshold value is unauthorized communication. The threshold value is, for example, a fixed value decided when creating normal behavior (normal model).

In the present embodiment, determiner 150 further determines that one or more communications, which satisfy that the communication specified by specifier 130 is not included in one or more communications indicated by communication whitelist 122, among the plurality of communications performed in manufacturing system 10 is unauthorized communication. For example, in the example shown in FIG. 3, among communications 1 to 8, it is determined that communication 3, communication 4, communication 7, and communication 8 are not included in the communications indicated by communication whitelist 122. Thus, determiner 150 determines that the four communications of communication 3, communication 4, communication 7, and communication 8 are unauthorized communications.

Outputter 160 outputs information for specifying unauthorized communication. Outputter 160 includes, for example, at least one of a display that displays an image, an audio outputter that outputs audio, or a data outputter that outputs data. The display is realized by, for example, a liquid crystal display device or the like. The audio outputter is realized by, for example, a speaker or the like. The data outputter outputs information for specifying unauthorized communication to an external server device such as a management server of a manager of manufacturing system 10 or a person who performs maintenance, for example, by performing wireless communication.

Information for specifying unauthorized communication is, for example, the name or installation position of two devices performing unauthorized communication or the like. The information for specifying the unauthorized communication may be the IP addresses of the two devices performing the unauthorized communication.

Figure 6:
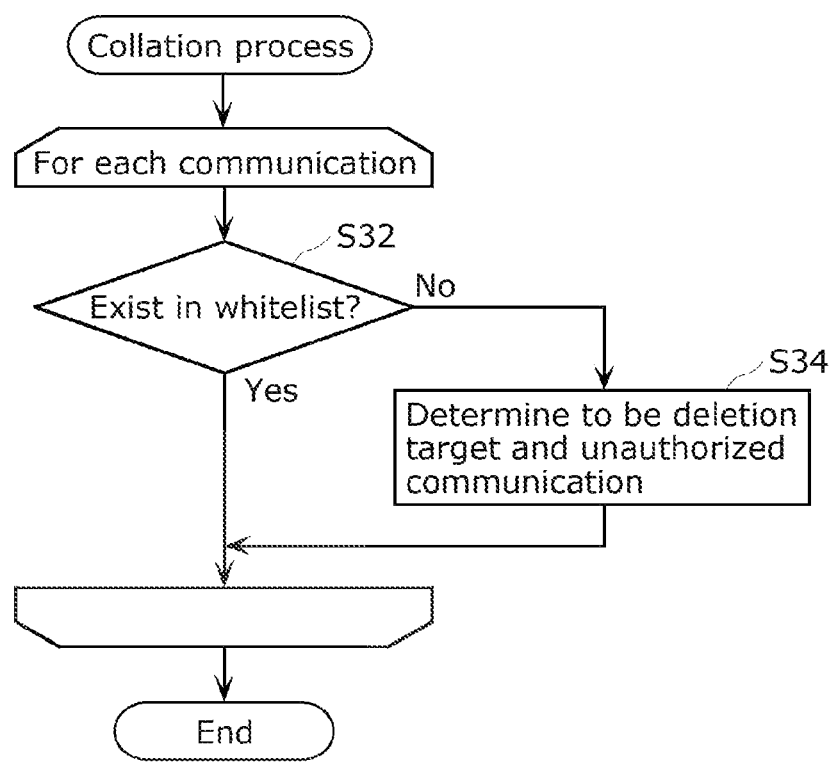
FIG. 6 is a flowchart showing a collation process with a communication whitelist among the operations of the unauthorized communication detection device according to Embodiment 1.
Figure 7:
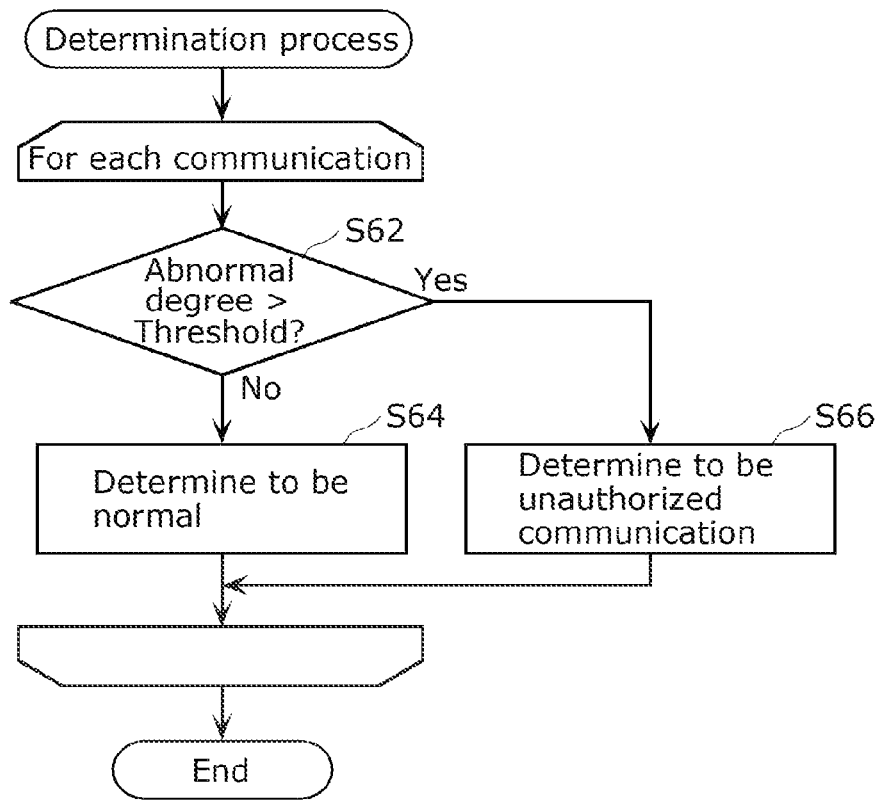
FIG. 7 is a flowchart showing an unauthorized communication determination process among the operations of the unauthorized communication detection device according to Embodiment 1.

Subsequently, the unauthorized communication detection process by unauthorized communication detection device 100 according to the present embodiment will be described with reference to FIG. 5 to FIG. 7.

Figure 5:
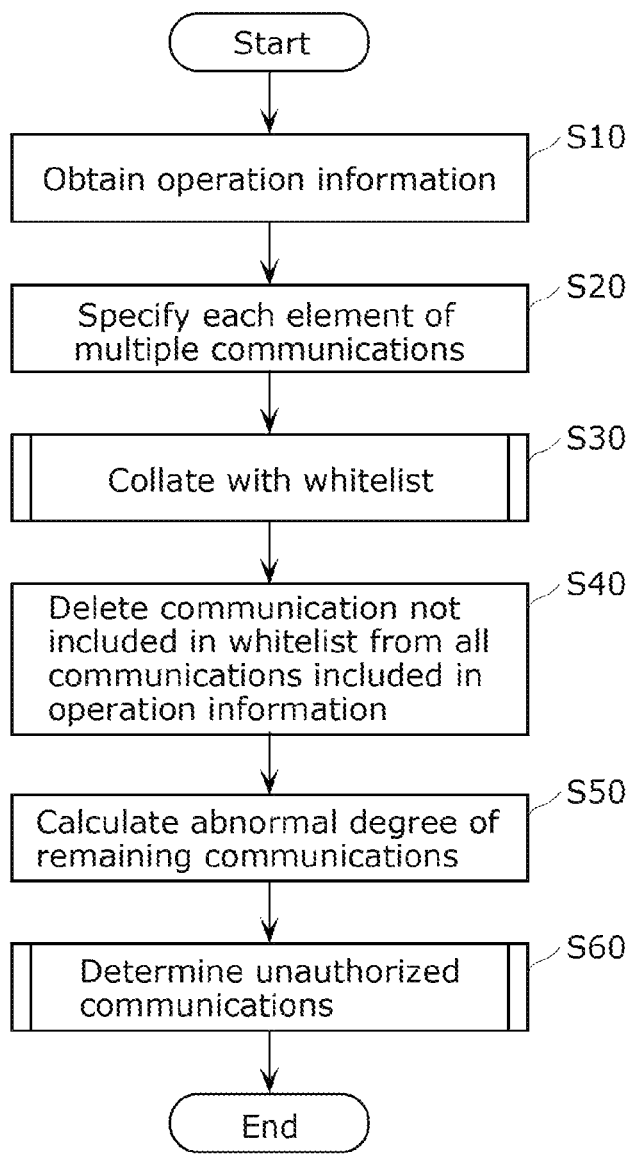
FIG. 5 is a flowchart showing the operation of the unauthorized communication detection device according to Embodiment 1.

FIG. 5 is a flowchart showing the operation of unauthorized communication detection device 100 according to the present embodiment. The unauthorized communication detection process shown in FIG. 5 is executed, for example, for each predetermined manufacturing unit. The manufacturing unit is, for example, a lot, or a time such as one hour or one day. Alternatively, the unauthorized communication detection process may be executed in substantially real time in accordance with the manufacturing operation of manufacturing system 10.

As shown in FIG. 5, first, obtainer 110 obtains the operation information (S10). Specifically, obtainer 110 obtains communication information regarding all communications performed within a predetermined manufacturing unit. The plurality of communication information obtained by obtainer 110 is temporarily stored in, for example, storage 120.

Next, specifier 130 specifies an element of each of the plurality of communications based on the operation information obtained by obtainer 110 (S20). Specifically, specifier 130 specifies each of the plurality of communications as an element. More specifically, specifier 130 specifies the source and the destination of each of the plurality of communications.

Next, calculator 140 performs a collation process with the whitelist (S30). FIG. 6 is a flowchart showing a collation process (S30) with communication whitelist 122 among the operations of unauthorized communication detection device 100 according to the present embodiment. As shown in FIG. 6, the collation process is performed for each communication.

Specifically, calculator 140 selects one communication information from the plurality of communication information obtained by obtainer 110, and determines whether or not the communication indicated by the selected communication information is included in communication whitelist 122 (S32). When the selected communication is not included in communication whitelist 122 (No in S32), calculator 140 determines that the communication is to be deleted and is unauthorized communication (S34). When the selected communication is included in communication whitelist 122 (Yes in S32), the process returns to step S32, one communication information is selected from the unselected communication information, and the collation with communication whitelist 122 is repeated targeted for the communication indicated by the selected communication information.

With this, the communication to be deleted is determined from all the target communications based on the operation information obtained by obtainer 110. In addition, the communication to be deleted is determined to be unauthorized communication.

As shown in FIG. 5, after the collation process (S30) is performed, calculator 140 deletes the communications not included in the whitelist (specifically, communication whitelist 122) from all the communications included in the operation information obtained by obtainer 110 (S40). That is, calculator 140 deletes the communication targeted for deletion in step 334.

Next, calculator 140 calculates the abnormal degrees of the remaining communications that have not been deleted, that is, the communications that have been included in the whitelist (350). For example, calculator 140 performs the behavior detection for each communication based on the communication feature amounts included in communication whitelist 122. With this, calculator 140 calculates an outlier from the normal behavior as the abnormal degree.

Next, determiner 150 performs a determination process of unauthorized communication based on the calculated abnormal degree (S60). FIG. 7 is a flowchart showing a determination process of unauthorized communication in the operations of unauthorized communication detection device 100 according to the present embodiment. As shown in FIG. 7, the determination process of unauthorized communication is performed for each communication.

Specifically, determiner 150 compares the calculated abnormal degree with the threshold value (S62). When the abnormal degree is equal to or less than the threshold value (No in S62), determiner 150 determines that the communication corresponding to the abnormal degree is normal communication (S64). When the abnormal degree is larger than the threshold value (Yes in S62), determiner 150 determines that a communication corresponding to the abnormal degree is the unauthorized communication (S66).

By the above processing, even if the communication is included in communication whitelist 122, unauthorized communication can be determined by statistical processing such as behavior detection. Thus, according to unauthorized communication detection device 100, even if the communication is permitted, it is possible to detect unauthorized communication based on infection by a virus, hijacking, malicious unauthorized operation, or the like. In addition, the communication not included in communication whitelist 122 can be determined as unauthorized communication by collating with communication whitelist 122.

Embodiment 2

Subsequently, Embodiment 2 will be described. In the following description, the differences from Embodiment 1 will be mainly described, and the description of the common points will be omitted or simplified.

Figure 8:
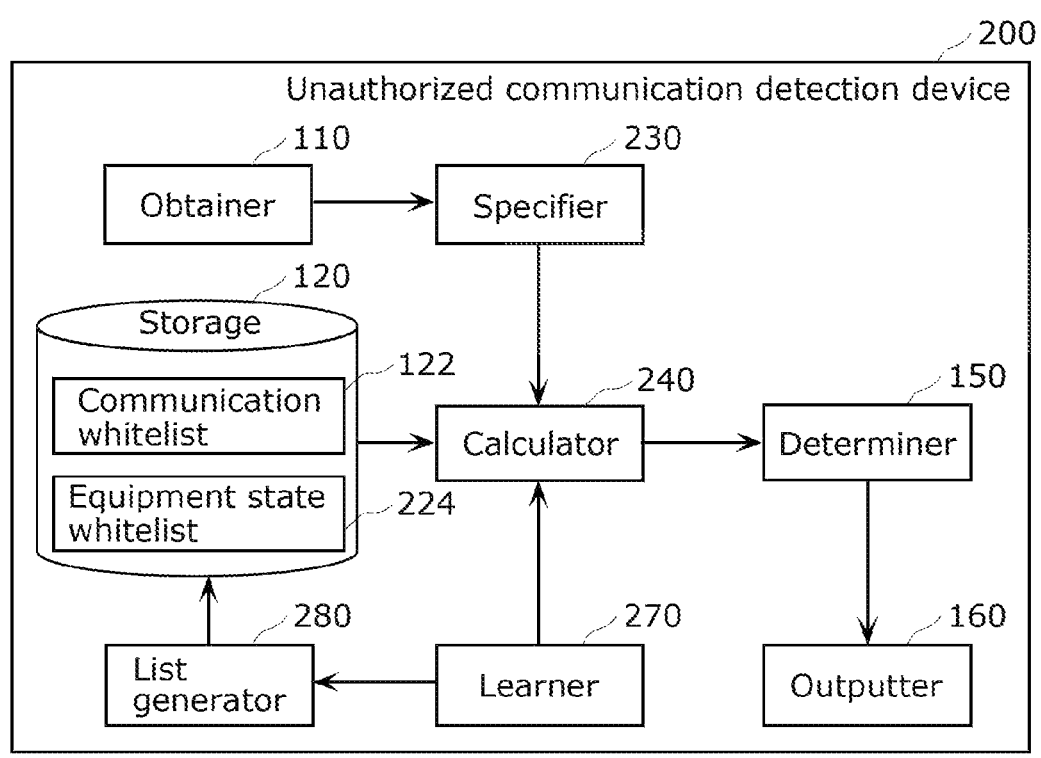
FIG. 8 is a block diagram showing a configuration of an unauthorized communication detection device according to Embodiment 2.

FIG. 8 is a block diagram showing the configuration of unauthorized communication detection device 200 according to the present embodiment. As shown in FIG. 8, unauthorized communication detection device 200 includes specifier 230 and calculator 240 instead of specifier 130 and calculator 140 as compared with unauthorized communication detection device 100 according to Embodiment 1. In addition, unauthorized communication detection device 200 further includes learner 270 and list generator 280. Storage 120 further stores equipment state whitelist 224.

Equipment state whitelist 224 is an example of equipment state information indicating one or more equipment states among a plurality of equipment states that manufacturing system 10 is capable of taking as one or more target elements. In the present embodiment, equipment state whitelist 224 is generated by list generator 280. Alternatively, equipment state whitelist 224 may be generated by registering one or more equipment states subject to unauthorized communication by the administrator of manufacturing system 10 or the like.

Figure 9:
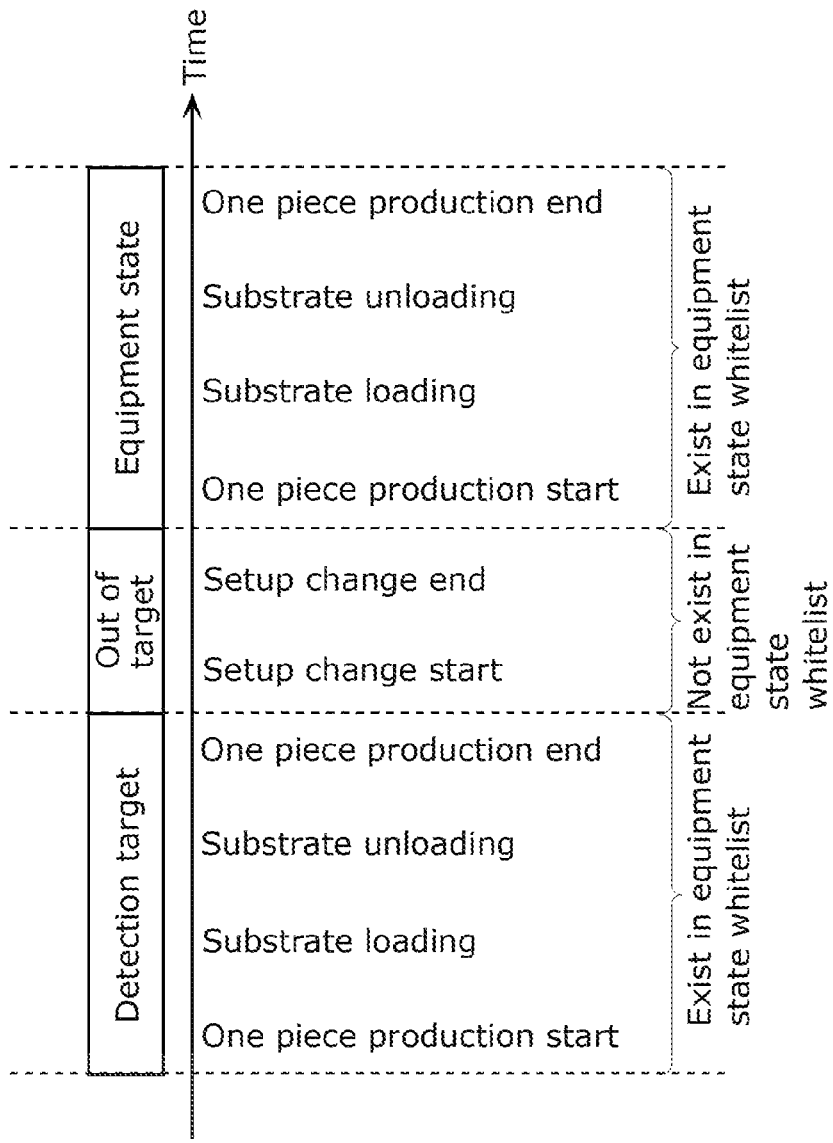
FIG. 9 is a diagram showing an example of collation results with respect to the equipment state whitelist for each equipment state.

The plurality of equipment states correspond to each manufacturing step performed by manufacturing device 30 or the like included in manufacturing system 10. The plurality of equipment states are, for example, as shown in FIG. 9, one piece production start, substrate loading, substrate unloading, one piece production end, setup change start, setup change end, and the like. It should be noted that FIG. 9 is a diagram showing an example of collation results with respect to the equipment state whitelist for each equipment state.

In addition to the operation of specifier 130, specifier 230 specifies, as the element, the equipment state at a time when each of the plurality of communications is performed, based on the operation information obtained by obtainer 110. For example, specifier 230 specifies the equipment state corresponding to the communication by analyzing the operation command included in the payload of the communication packet. The operation command is, for example, a command transmitted from control device 20 to manufacturing device 30, 32 or 34, or a command transmitted between at least two devices of manufacturing devices 30, 32 and 34.

Calculator 240 reads communication whitelist 122 and equipment state whitelist 224 out of storage 120. Calculator 240 calculates the abnormal degree for each of one or more communications, which satisfy that the communication specified by specifier 230, among the plurality of communications performed in manufacturing system 10 is included in one or more communications indicated by communication whitelist 122, and that the equipment state specified by specifier 230 is included in one or more equipment states indicated by equipment state whitelist 224. That is, one or more communications for which the abnormal degree is calculated are communications included in communication whitelist 122, and are communications performed during the period when manufacturing system 10 is in the equipment state indicated by equipment state whitelist 224. The specific method of calculating the abnormal degree by calculator 240 is the same as that of Embodiment 1. In the present embodiment, calculator 240 calculates an outlier from the normal model created by learner 270 as the abnormal degree.

In the example shown in FIG. 9, four equipment states of one piece production start, substrate loading, substrate unloading, and one piece production end are included in equipment state whitelist 224. Thus, the abnormal degree is calculated and the unauthorized communication is determined for the communication performed during the period when manufacturing system 10 is in these four equipment states. In addition, the two equipment states: the setup change start and the setup change end, are not included in equipment state whitelist 224. Thus, the abnormal degree is not calculated for the communication performed during the period when manufacturing system 10 is in these two equipment states.

Learner 270 creates a normal model used for calculating the abnormal degree by performing machine learning using the operation information obtained in advance. The machine learning method is not particularly limited. For example, learner 270 performs machine learning using the operation information when manufacturing system 10 is actually operated or the operation information based on the simulation imitating manufacturing system 10. With this, learner 270 creates a normal model of manufacturing system 10.

For example, unauthorized communication is not included in the plurality of communications included in the operation information targeted for machine learning. That is, learner 270 performs machine learning using the operation information during the period in which it can be confirmed that no unauthorized communication has occurred.

List generator 280 is an example of an information generator that generates information indicating as one or more target elements one or more elements corresponding to each of a plurality of communications included in the operation information targeted for machine learning as element information. Specifically, list generator 280 specifies one or more equipment states when each of the plurality of communications included in the operation information targeted for machine learning by learner 270 is performed, lists the specified one or more equipment states, and to thereby create equipment state whitelist 224. Alternatively, list generator 280 may specify one or more equipment states when a plurality of communications included in the operation information targeted for machine learning by learner 270 are performed, and one or more events generated at that time. List generator 280 may generate equipment state whitelist 224 by listing the specified one or more equipment states and the one or more equipment states after the transition with the occurrence of the event. List generator 280 stores the generated equipment state whitelist 224 in storage 120. In addition, list generator 280 may generate communication whitelist 122 by listing a plurality of communications included in the operation information targeted for machine learning by learner 270.

In this way, equipment state whitelist 224 is generated based on the results of machine learning in unauthorized communication detection device 200 according to the present embodiment. That is, since the equipment state that is not the target of machine learning can be excluded from the detection target of unauthorized communication, erroneous determination can be suppressed, and the determination accuracy of unauthorized communication can be improved.

It should be noted that communication whitelist 122 may not be stored in storage 120. In this case, specifier 230 does not have to specify the communication by specifying, as the element, only the equipment state at a time when each of the plurality of communications is performed, based on the operation information obtained by obtainer 110. Calculator 240 may calculate an abnormal degree for each of one or more communications, which satisfy that the equipment state specified by specifier 230 is included in one or more equipment states indicated by equipment state whitelist 224, among the plurality of communications performed in manufacturing system 10. That is, calculator 240 may only collate equipment state whitelist 224.

Embodiment 3

Subsequently, Embodiment 3 will be described. In the following description, the differences from Embodiment 2 will be mainly described, and the description of the common points will be omitted or simplified.

Figure 10:
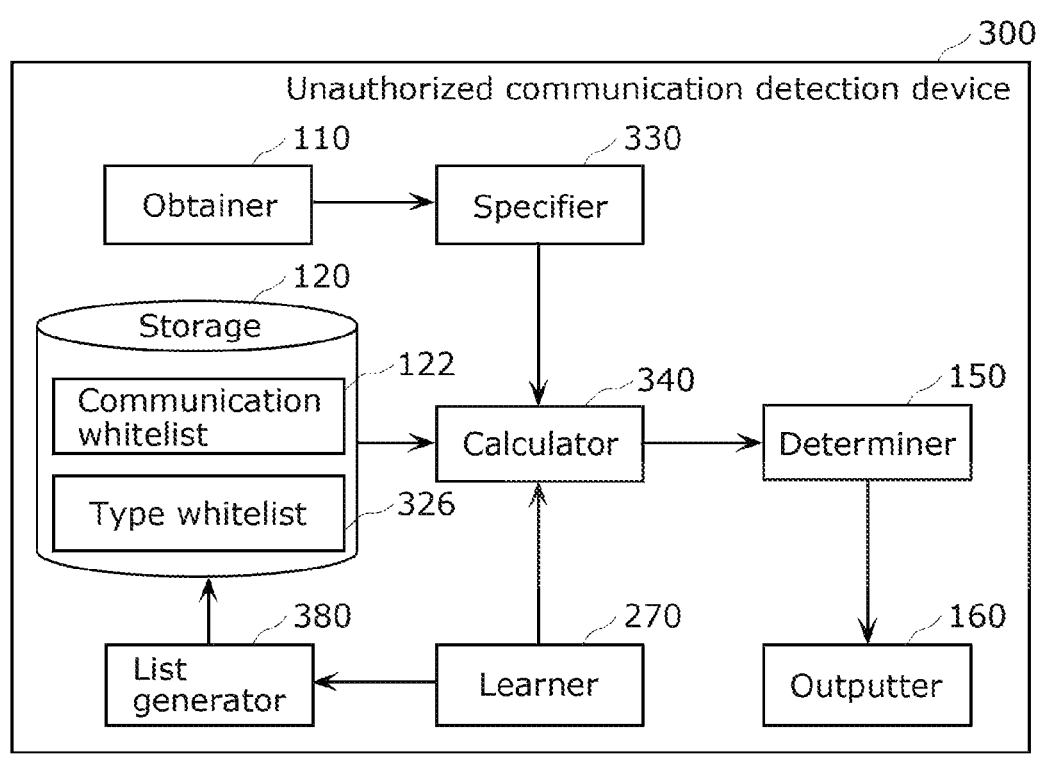
FIG. 10 is a block diagram showing a configuration of an unauthorized communication detection device according to Embodiment 3.

FIG. 10 is a block diagram showing the configuration of unauthorized communication detection device 300 according to the present embodiment. As shown in FIG. 10, unauthorized communication detection device 300 includes specifier 330, calculator 340, and list generator 380 instead of specifier 230, calculator 240, and list generator 280 in comparison with unauthorized communication detection device 200 according to Embodiment 2. Storage 120 stores type whitelist 326 instead of equipment state whitelist 224. Manufacturing system 10 according to the present embodiment manufactures a plurality of different types of products.

Type whitelist 326 is an example of type information indicating one or more types of a plurality of products as one or more target elements. In the present embodiment, type whitelist 326 is generated by list generator 380. Alternatively, type whitelist 326 may be generated by having the administrator of manufacturing system 10 or the like register one or more types to be detected by unauthorized communication.

The type of product corresponds to, for example, the model number or name of the product. For example, in the example shown in FIG. 11, the type of product is indicated by a name such as product A or product B. It should be noted that FIG. 11 is a diagram showing an example of the collation results with respect to the type whitelist for each type.

Specifier 330 specifies the type of products manufactured when each of a plurality of communications is performed based on the operation information obtained by obtainer 110 in addition to the operation of specifier 130 according to Embodiment 1. For example, specifier 330 obtains the transmission time or reception time of the communication packet as the communication time, and specifies the type of the product manufactured during the period including the obtained communication time.

Calculator 340 reads communication whitelist 122 and type whitelist 326 out of storage 120. Calculator 340 calculates the abnormal degree for each of one or more communications, which satisfy that the communication specified by specifier 330 is included in one or more communications indicated by communication whitelist 122, and the type specified by specifier 330 is included in one or more types indicated by type whitelist 326, among the plurality of communications performed in manufacturing system 10. That is, one or more communications targeted for which the calculation of the abnormal degree are communications included in communication whitelist 122, and communications performed during the period in which the type of product indicated by type whitelist 326 was manufactured. The specific method of calculating the abnormal degree by calculator 340 is the same as that of Embodiment 1. In the present embodiment, calculator 340 calculates an outlier from the normal model generated by learner 270 as the abnormal degree.

Figure 11:
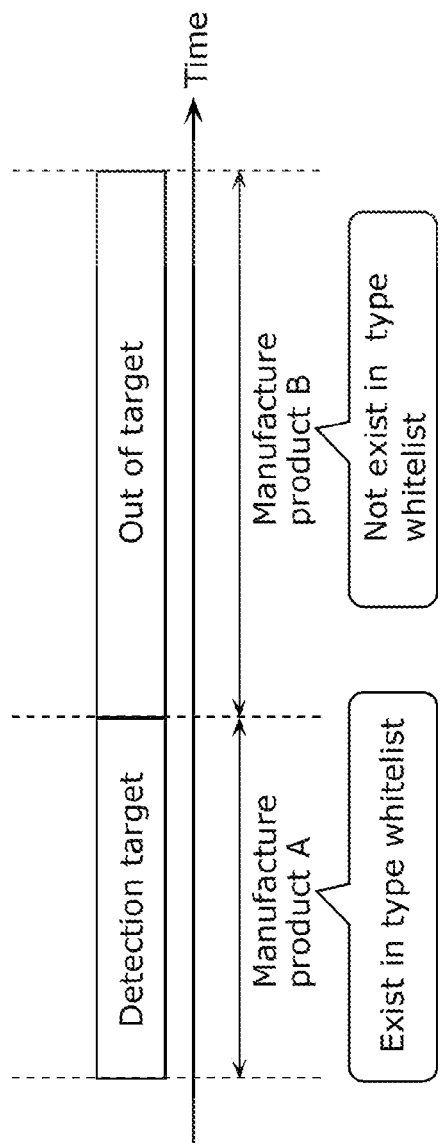
FIG. 11 is a diagram showing an example of collation results with respect to a type whitelist for each product.

In the example shown in FIG. 11, product A is included in type whitelist 326. Thus, the calculation of the abnormal degree and the determination of unauthorized communication are performed for the communication performed during the manufacturing period of product A. In addition, product B is not included in type whitelist 326. Thus, the calculation of the abnormal degree is not performed for the communication performed during the manufacturing period of product B.

List generator 380 is an example of an information generator that generates information indicating as one or more target elements one or more elements corresponding to each of a plurality of communications included in the operation information targeted for machine learning as element information. Specifically, list generator 380 specifies one or more types of products manufactured when each of the plurality of communications included in the operation information targeted for machine learning by learner 270 is performed, lists the specified one or more types, and to thereby generate type whitelist 326. List generator 380 stores the generated type whitelist 326 in storage 120. In addition, list generator 380 may generate communication whitelist 122 by listing a plurality of communications included in the operation information targeted for machine learning by learner 270.

In this way, type whitelist 326 is generated based on the results of machine learning in unauthorized communication detection device 300 according to the present embodiment. That is, since the communication performed when products of a type that was not the target of machine learning are manufactured can be excluded from the detection target of unauthorized communication, it is possible to suppress erroneous determination and improve the determination accuracy of unauthorized communication.

It should be noted that communication whitelist 122 may not be stored in storage 120. In this case, specifier 330 specifies, as the element, only the type of the product manufactured at a time when each of the plurality of communications is performed, based on the operation information obtained by obtainer 110, and may not specify the communication. Calculator 340 may calculate an abnormal degree for each of one or more communications, which satisfy that the type specified by specifier 220 is included in the one or more types indicated by type whitelist 326, among the plurality of communications performed in manufacturing system 10. That is, calculator 340 may only collate with type whitelist 326.

Embodiment 4

Subsequently, Embodiment 4 will be described. In the following description, the differences from Embodiment 2 will be mainly described, and the description of the common points will be omitted or simplified.

Figure 12:
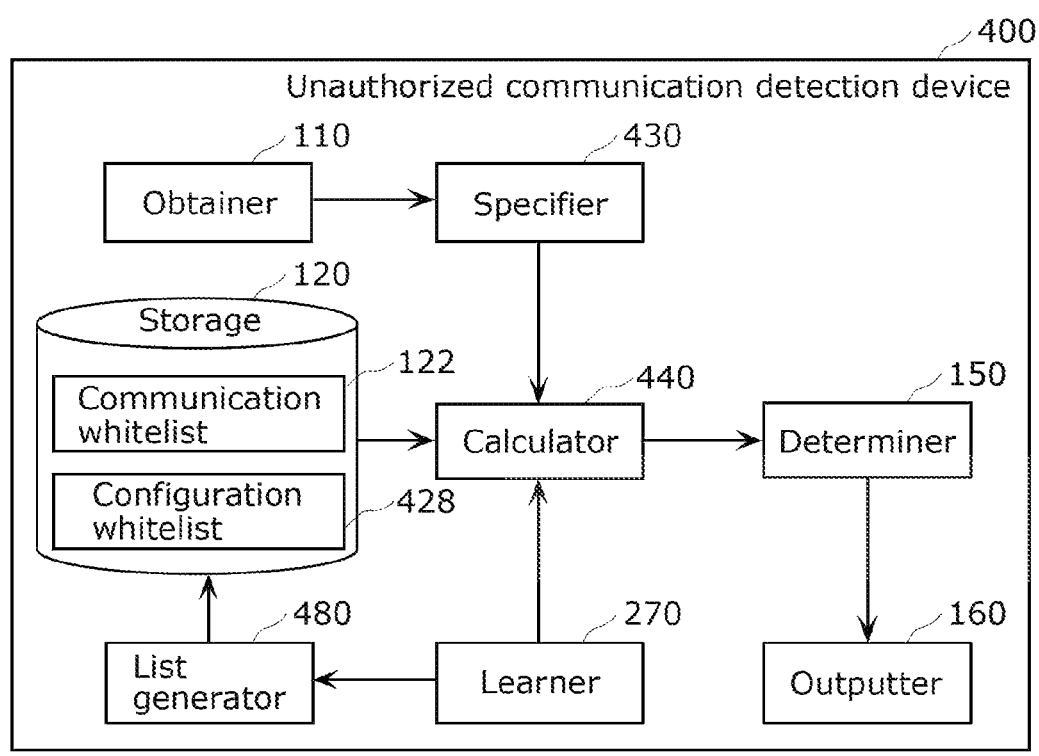
FIG. 12 is a block diagram showing a configuration of an unauthorized communication detection device according to Embodiment 4.

FIG. 12 is a block diagram showing the configuration of unauthorized communication detection device 400 according to the present embodiment. As shown in FIG. 12, unauthorized communication detection device 400 includes specifier 430, calculator 440, and list generator 480 instead of specifier 230, calculator 240, and list generator 280 in comparison with unauthorized communication detection device 200 according to Embodiment 2. Storage 120 stores configuration whitelist 428 instead of equipment state whitelist 224.

Configuration whitelist 428 is an example of configuration information indicating one or more equipment configurations among a plurality of equipment configurations of manufacturing system 10 as one or more target elements. In the present embodiment, configuration whitelist 428 is generated by list generator 480. Alternatively, configuration whitelist 428 may be generated by having the administrator of manufacturing system 10 or the like register one or more equipment configurations to be detected for unauthorized communication.

The equipment configuration of manufacturing system 10 is represented by, for example, a combination of types and arrangement positions of a plurality of manufacturing devices configuring manufacturing system 10. For example, as shown in FIG. 13, the type or arrangement of the manufacturing devices is different between equipment configuration A and equipment configuration B of manufacturing system 10. It should be noted that FIG. 13 is a diagram showing an example of collation results with respect to the configuration whitelist for each equipment configuration.

In the present embodiment, manufacturing system 10 can have a plurality of equipment configurations. For example, at least one of manufacturing devices 30, 32 or 34 included in manufacturing system 10 can be replaced with a different type of manufacturing device. Alternatively, the arrangement of manufacturing devices 30, 32 and 34 in the manufacturing line can be changed.

Specifier 430 specifies the equipment configuration when a plurality of communications are performed as an element based on the operation information obtained by obtainer 110 in addition to the operation of specifier 130 according to Embodiment 1. For example, specifier 430 obtains the transmission time or the reception time of the communication packet as the communication time, and specifies the equipment configuration of manufacturing system 10 during the period including the obtained communication time.

Calculator 440 reads communication whitelist 122 and configuration whitelist 428 out of storage 120. Calculator 440 calculates the abnormal degree of each of one or more communications, which satisfy that the communication specified by specifier 430, among the plurality of communications performed in manufacturing system 10 is included in one or more communications indicated by communication whitelist 122, and that the equipment configuration specified by specifier 430 is included in the one or more equipment configurations indicated by configuration whitelist 428. That is, one or more communications for which the abnormal degree is calculated are communications included in communication whitelist 122, and communications performed when the products are manufactured with the equipment configuration shown in configuration whitelist 428. The specific calculation method of the abnormal degree by calculator 440 is the same as that of Embodiment 1. In the present embodiment, calculator 440 calculates the outlier from the normal model generated by learner 270 as the abnormal degree.

In the example shown in FIG. 14, equipment configuration A is included in configuration whitelist 428. Thus, the calculation of the abnormal degree and the determination of the unauthorized communication are performed for the communication performed while manufacturing system 10 is operating in equipment configuration A. In addition, equipment configuration B is not included in configuration whitelist 428. Thus, the abnormal degree is not calculated for the communication performed while manufacturing system 10 is operating in equipment configuration B.

List generator 480 is an example of information generator that generates information indicating one or more elements corresponding to each of a plurality of communications included in the operation information targeted for machine learning as one or more target elements. Specifically, list generator 480 generates configuration whitelist 428 by specifying one or more equipment configurations when each of the plurality of communications included in the operation information targeted for machine learning by learner 270 and listing the specified one or more equipment configurations. List generator 480 stores the generated configuration whitelist 428 in storage 120. In addition, list generator 480 may generate communication whitelist 122 by listing a plurality of communications included in the operation information targeted for machine learning by learner 270.

In this way, in unauthorized communication detection device 400 according to the present embodiment, configuration whitelist 428 is generated based on the results of machine learning. That is, since the communication performed while manufacturing system 10 is operating in the equipment configuration that was not the target of machine learning can be excluded from the detection target of unauthorized communication, erroneous determination can be suppressed, and the determination accuracy for the unauthorized communication can be improved.

It should be noted that communication whitelist 122 may not be stored in storage 120. In this case, specifier 430 specifies, as the element, only the equipment configuration at a time when each of the plurality of communications is performed, based on the operation information obtained by obtainer 110, and may not specify communication. Calculator 440 may calculate an abnormal degree of each of one or more communications, which satisfy that the equipment configuration specified by specifier 430 is included in one or more equipment configurations indicated by configuration whitelist 428, among the plurality of communications performed in manufacturing system 10. That is, calculator 440 may only collate with configuration whitelist 428.

Variations

Here, variations of the above embodiments will be described.

In Embodiment 2 to Embodiment 4, an example in which storage 120 stores two whitelists: (i) communication whitelist 122, and (ii) one of equipment state whitelist 224, type whitelist 326, and configuration whitelist 428 is shown, but it is not limited thereto. For example, even if storage 120 may store three or four (all) selected from communication whitelist 122, equipment state whitelist 224, type whitelist 326, and configuration whitelist 428.

In this case, specifier 230 specifies an element corresponding to the target element indicated by the whitelist stored in storage 120. Calculator 240 calculates the abnormal degree of each of one or more communications, which satisfy that the element specified by specifier 230 is included in the target elements indicated by all the whitelists stored in storage 120, among the plurality of communications.

For example, when communication whitelist 122, equipment state whitelist 224, and type whitelist 326 are stored in storage 120, specifier 230 specifies, as the element, each of the plurality of communications, the equipment state at the time when the communications are performed, and the type of products manufactured at the time when the communications are performed, based on the operation information obtained by obtainer 110.

FIG. 14 is a diagram showing an example of collation results for each of equipment state whitelist 224 and type whitelist 326. As shown in FIG. 14, calculator 240 calculates the abnormal degree only for the communication during the period when the equipment state is included in equipment state whitelist 224 and the type of product included in type whitelist 326 is manufactured. Specifically, calculator 240 calculates the abnormal degree of the communication during the period of the equipment states which are the one piece production start, the substrate loading, the substrate unloading, and the one piece production end included in equipment state whitelist 224 within the production period of product A included in type whitelist 326. Even within the manufacturing period of product A, communications during the period in the equipment states of the setup change start and the setup change end which are not included in equipment state whitelist 224 are not subject to the calculation of the abnormal degree and the detection of the unauthorized communication. In addition, communication during the manufacturing period of product B, which is not included in type whitelist 326, is not subject to the calculation of the abnormal degree and the detection of the unauthorized communication, even if it is communication during the period of the equipment states which are the one piece production start, the substrate loading, the substrate unloading, and the one piece production end included in equipment state whitelist 224.

OTHER EMBODIMENTS

Although unauthorized communication detection device, the unauthorized communication detection method, the manufacturing system, and the like according to one or more aspects have been described above based on the embodiments, the present disclosure is not limited to these embodiments. A form obtained by applying various variations that a person skilled in the art can conceive to the embodiments, and a form realized by combining the components in different embodiments without departing from the spirit of the present disclosure are also included in this disclosure.

For example, in the above embodiment, an example of detecting unauthorized communication, which is an example of an abnormality in the manufacturing system, is shown, but the present invention is not limited thereto. For example, the present disclosure may be realized as an abnormality detection device for detecting an abnormality in a manufacturing system, an abnormality detection method, or a manufacturing system including an abnormality detection device.

For example, the calculator calculates the abnormal degree of one or more elements, which satisfy that the element specified by the specifier is included in one or more target elements indicated by the element information, among a plurality of elements related to the production of the products. For example, the calculator extracts the feature amounts of one or more elements for which the abnormal degree is calculated from the operation information. The feature amounts are, for example, the number of times an error occurs in a manufacturing device, the time required to manufacture one product, the power consumption required to manufacture one product, and the like. The calculator may calculate the abnormal degree for each element by statistically processing these feature amounts. For example, the calculator may calculate the abnormal degree for each equipment state, the abnormal degree for each type of product, and the abnormal degree for each equipment configuration. By comparing the abnormal degree calculated by the calculator with a threshold value, when the abnormal degree is larger than the threshold value, the determiner determines that the element corresponding to the abnormal degree is abnormal.

In addition, for example, the communication method between the devices described in the above embodiment is not particularly limited. When wireless communication is performed between devices, the wireless communication method (communication standard) is, for example, short-range wireless communication such as ZigBee (registered trademark), Bluetooth (registered trademark), or wireless LAN (Local Area Network). Alternatively, the wireless communication method (communication standard) may be communication via a wide area communication network such as the Internet. In addition, wired communication may be performed between the devices instead of wireless communication. Specifically, the wired communication is a power line communication (PLC) or a communication using a wired LAN.

In addition, in the above embodiment, another processor may execute the process executed by the specific processor. In addition, the order of the plurality of processes may be changed, or the plurality of processes may be executed in parallel. In addition, the distribution of the components included in the manufacturing system to a plurality of devices is an example. For example, the components of one device may be included in another device. In addition, the manufacturing system may be realized as a single device.

For example, the processes described in the above embodiment may be realized by centralized processing using a single device (system), or may be realized by distributed processing using a plurality of devices. In addition, the number of processors that execute the above program may be singular or plural. That is, centralized processing may be performed, or distributed processing may be performed.

In addition, in the above embodiment, all or a part of the components such as the controller may be configured by a dedicated hardware, or may be realized by executing a software program suitable for each component. Each component may be realized by a program executer such as a CPU (Central Processor) or a processor reading and executing a software program recorded on a recording medium such as an HDD (Hard Disk Drive) or a semiconductor memory.

In addition, a component such as a controller may include one or more of electronic circuits. The one or more electronic circuits may be general-purpose circuits or dedicated circuits, respectively.

One or more electronic circuits may include, for example, a semiconductor device, an IC (Integrated Circuit), an LSI (Large Scale Integration), or the like. The IC or LSI may be integrated on one chip or may be integrated on a plurality of chips. Here, it is called IC or LSI, but the name changes depending on the degree of integration, and it may be called system LSI, VLSI (Very Large Scale Integration), or ULSI (Ultra Large Scale Integration). In addition, an FPGA (Field Programmable Gate Array) programmed after the LSI is manufactured can also be used for the same purpose.

In addition, the general or specific aspects of the present disclosure may be realized by a system, a device, a method, an integrated circuit or a computer program. Alternatively, it may be realized by a computer-readable non-transitory recording medium such as an optical disk, HDD or semiconductor memory on which the computer program is stored. In addition, it may be realized by any combination of a system, a device, a method, an integrated circuit, a computer program and a recording medium.

In addition, in each of the above embodiments, various changes, replacements, additions, omissions, and the like can be made within the scope of the claims or the equivalents thereof.

INDUSTRIAL APPLICABILITY

The present disclosure can be used as an unauthorized communication detection device or the like capable of accurately detecting unauthorized communication in a manufacturing system, and can be used, for example, as a management device or the like of a manufacturing system.

The invention claimed is:

1. An unauthorized communication detection device that detects an unauthorized communication in a manufacturing system that manufactures products, the unauthorized communication detection device comprising:
    a hardware processor that obtains operation information of the manufacturing system; and
    a storage that stores a whitelist indicating one or more permitted elements among a plurality of elements related to manufacturing of the products, wherein:
    the hardware processor:
        specifies an element corresponding to each of a plurality of communications performed in the manufacturing system, based on the operation information;
        calculates an abnormal degree of each of one or more communications, among the plurality of communications; and
        determines that, when the abnormal degree calculated by the hardware processor is larger than a threshold value, a communication corresponding to the abnormal degree is the unauthorized communication,
    the whitelist includes an equipment state whitelist indicating one or more permitted equipment states among a plurality of equipment states that the manufacturing system is capable of taking as the one or more permitted elements,
    the hardware processor further specifies, as the element, an equipment state at a time when each of the plurality of communications is performed, based on the operation information,
    collating each of a plurality of elements each of which is the element specified by the hardware processor with the equipment state whitelist to determine whether each of the plurality of elements specified by the hardware processor is included in the equipment state whitelist,
    the hardware processor:
        (a) calculates the abnormal degree of one or more communications corresponding to a plurality of elements determined to be included in the equipment state whitelist among the plurality of elements specified by the hardware processor; and
        (b) does not calculate the abnormal degree of one or more communications corresponding to a plurality of elements determined not to be included in the equipment state whitelist among the plurality of elements specified by the hardware processor, and
    the abnormal degree is calculated by a machine learning method.

2. The unauthorized communication detection device according to claim 1,
    wherein:
    the whitelist includes permitted communication information indicating one or more permitted communications as the one or more permitted elements,
    the element specified by the hardware processor is a communication itself of each of the plurality of communications, based on the operation information, and
    the hardware processor calculates the abnormal degree of each of the one or more communications, which satisfy that the communication specified by the hardware processor is included in the one or more permitted communications indicated by the permitted communication information, among the plurality of communications.

3. The unauthorized communication detection device according to claim 2, wherein
    the hardware processor further determines that one or more non-white communications, which do not satisfy that the communication specified by the hardware processor is included in the one or more permitted communications indicated by the permitted communication information, among the plurality of communications, are the unauthorized communications.

4. The unauthorized communication detection device according to claim 2, wherein:
    the manufacturing system manufactures a plurality of the products which are of different types,
    the whitelist further includes a type whitelist indicating one or more permitted types of the plurality of products as the one or more permitted elements,
    the hardware processor further specifies, as the element, a type of products manufactured at a time when each of the plurality of communications is performed, based on the operation information, and
    the hardware processor calculates the abnormal degree of each of one or more communications, which further satisfy that the type of products specified by the hardware processor is included in the one or more permitted types indicated by the type whitelist, among the plurality of communications.

5. The unauthorized communication detection device according to claim 2, wherein:
    the whitelist further includes a configuration whitelist indicating one or more permitted equipment configurations among a plurality of equipment configurations of the manufacturing system as the one or more permitted elements,
    the hardware processor further specifies, as the element, an equipment configuration at a time when each of the plurality of communications is performed, based on the operation information, and
    the hardware processor calculates the abnormal degree of each of one or more communications, which further satisfy that the equipment configuration specified by the hardware processor is included in the one or more permitted equipment configurations indicated by the configuration whitelist, among the plurality of communications.

6. The unauthorized communication detection device according to claim 1, wherein the hardware processor calculates an outlier from a normal model of communication performed by the manufacturing system as the abnormal degree.

7. The unauthorized communication detection device according to claim 1, wherein:
the whitelist includes an equipment state whitelist indicating one or more permitted equipment states among a plurality of equipment states that the manufacturing system is capable of taking as the one or more permitted elements,
the hardware processor specifies, as the element, an equipment state at a time when each of the plurality of communications is performed, based on the operation information, and
the hardware processor calculates the abnormal degree of each of one or more communications, which satisfy that the equipment state specified by the hardware processor is included in the one or more permitted equipment states indicated by the equipment state whitelist, among the plurality of communications.

8. The unauthorized communication detection device according to claim 1, wherein:
the manufacturing system manufactures a plurality of the products which are of different types,
the whitelist includes a type information whitelist indicating one or more permitted types of the plurality of products as the one or more permitted elements,
the hardware processor specifies, as the element, a type of products manufactured at a time when each of the plurality of communications is performed, based on the operation information, and
the hardware processor calculates the abnormal degree of each of one or more communications, which satisfy that the type of product specified by the hardware processor is included in the one or more permitted types indicated by the type whitelist, among the plurality of communications.

9. The unauthorized communication detection device according to claim 1, wherein:
the whitelist includes a configuration whitelist indicating one or more permitted equipment configurations among a plurality of equipment configurations of the manufacturing system as the one or more permitted elements,
the hardware processor specifies, as the element, an equipment configuration at a time when each of the plurality of communications is performed, based on the operation information, and
the hardware processor calculates the abnormal degree of each of one or more communications, which satisfy that the equipment configuration specified by the hardware processor is included in the one or more permitted equipment configurations indicated by the configuration whitelist, among the plurality of communications.

10. A manufacturing system that manufactures products, the manufacturing system comprising:
manufacturing equipment; and
the unauthorized communication detection device according to claim 1.

11. The unauthorized communication detection device according to claim 1, wherein the abnormal degree is an outliner from normal behavior of communication.

12. An unauthorized communication detection method in which unauthorized communication in a manufacturing system that manufactures products is detected, the unauthorized communication detection method comprising:
obtaining operation information of the manufacturing system;
reading a whitelist indicating one or more permitted elements among a plurality of elements related to manufacturing of the products out of a storage;
specifying, for each of a plurality of communications performed in the manufacturing system, an element corresponding to the communication, based on the operation information;
determining one or more communications, which satisfy that the element specified is included in one or more permitted elements indicated by the whitelist, among the plurality of communications;
calculating, after collating each of a plurality of elements each of which is the element specified in the specifying with the whitelist, an abnormal degree of each of the one or more communications; and
determining that a communication corresponding to the abnormal degree is the unauthorized communication when the abnormal degree calculated exceeds a threshold value, wherein:
the whitelist includes an equipment state whitelist indicating one or more permitted equipment states among a plurality of equipment states that the manufacturing system is capable of taking as the one or more permitted elements,
the specifying comprises specifying, as the element, an equipment state at a time when each of the plurality of communications is performed, based on the operation information,
after collating each of a plurality of elements each of which is the element specified in the specifying with the equipment state whitelist to determine whether each of the plurality of elements specified in the specifying is included in the equipment state whitelist, the calculating comprises:
  (a) calculating the abnormal degree of one or more communications corresponding to a plurality of elements determined to be included in the equipment state whitelist among the plurality of elements specified in the specifying; and
  (b) not calculating the abnormal degree of one or more communications corresponding to a plurality of elements determined not to be included in the equipment state whitelist among the plurality of elements specified in the specifying, and
the abnormal degree is calculated by a machine learning method.

13. A non-transitory computer-readable recording medium having recorded thereon a program for causing a computer to execute the unauthorized communication detection method according to claim 12.

14. The unauthorized communication detection method according to claim 12, wherein:
the whitelist includes permitted communication information indicating one or more permitted communications as the one or more permitted elements,
the element specified is a communication itself of each of the plurality of communications, and
the abnormal degree is calculated for each of one or more communications, which satisfy that the communication specified is included in the one or more permitted communications indicated by the permitted communication information, among the plurality of communications.

15. The unauthorized communication detection method according to claim 14, wherein it is further determined that one or more non-white communications, which do not satisfy that the communication specified is included in the one or more permitted communications indicated by the permitted communication information, among the plurality of communications, are the unauthorized communications.

16. The unauthorized communication detection method according to claim 12, wherein the abnormal degree is an outliner from normal behavior of communication.

* * * * *